US011904195B2

(12) United States Patent
Thomas

(10) Patent No.: US 11,904,195 B2
(45) **Date of Patent: *Feb. 20, 2024**

(54) SELF-CONTAINED FIRE EXTINGUISHER WITH AUTOMATED FIRE DETECTION

(71) Applicant: C. Douglass Thomas, Saratoga, CA (US)

(72) Inventor: Alan E. Thomas, Ocean City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,460

(22) Filed: Nov. 7, 2022

(65) Prior Publication Data

US 2023/0065590 A1 Mar. 2, 2023

Related U.S. Application Data

(63) Continuation of application No. 17/122,891, filed on Dec. 15, 2020, now Pat. No. 11,504,562, which is a continuation of application No. 16/536,296, filed on Aug. 8, 2019, now Pat. No. 10,864,398, which is a continuation of application No. 16/138,858, filed on Sep. 21, 2018, now Pat. No. 10,376,725, which is a continuation of application No. 14/878,864, filed on Oct. 8, 2015, now Pat. No. 10,086,224, which is a (Continued)

(51) Int. Cl.

| | |
|---|---|
| ***A62C 37/40*** | (2006.01) |
| ***A62C 37/36*** | (2006.01) |
| ***A62C 37/10*** | (2006.01) |
| ***A62C 13/64*** | (2006.01) |
| ***A62C 35/02*** | (2006.01) |
| ***A62C 37/11*** | (2006.01) |

(52) U.S. Cl.

CPC .............. *A62C 37/40* (2013.01); *A62C 13/64* (2013.01); *A62C 35/023* (2013.01); *A62C 37/10* (2013.01); *A62C 37/11* (2013.01); *A62C 37/36* (2013.01); *A62C 35/02* (2013.01)

(58) Field of Classification Search

CPC ....... A62C 37/40; A62C 13/64; A62C 35/023; A62C 37/10; A62C 37/11; A62C 37/36; A62C 35/02

USPC ............................................................ 169/19

See application file for complete search history.

(56) References Cited

U.S. PATENT DOCUMENTS 1,510,649 A * 10/1924 Boyce .................. A62C 13/003 169/26
3,517,746 A * 6/1970 Balmes, Sr. ......... A62C 13/006 169/61

(Continued)

OTHER PUBLICATIONS

Notice of Allowance for U.S. Appl. No. 17/122,891, dated Jul. 20, 2022.

(Continued)

*Primary Examiner* — Justin M Jonaitis
(74) *Attorney, Agent, or Firm* — C. Douglass Thomas

(57) ABSTRACT

A fire detection device and method therefor are able to provide automatic activation so as to extinguish a fire. The fire detection can be rapid and temperature-based. In one embodiment, a heat collector can be provided to enhance thermal responsiveness. Activation of the fire detection device can be electrically or mechanically induced to release an extinguishing agent at the fire. The activation can be protected such that it is durable and unaffected by vibrations.

10 Claims, 6 Drawing Sheets

Related U.S. Application Data continuation of application No. 13/405,139, filed on Feb. 24, 2012, now Pat. No. 9,162,095.

(60) Provisional application No. 61/451,062, filed on Mar. 9, 2011.

(56) References Cited

U.S. PATENT DOCUMENTS

| | | | | | |
|---|---|---|---|---|---|
| 3,719,231 | A * | 3/1973 | Haggard | A62C 13/64 | 169/56 |
| 4,098,343 | A * | 7/1978 | Carroll | A62C 35/02 | 169/42 |
| 4,830,116 | A | 5/1989 | Walden | | |
| 4,887,674 | A | 12/1989 | Galosky | | |
| 4,893,680 | A | 1/1990 | Wittbrodt | | |
| 4,984,637 | A | 1/1991 | Finnegan | | |
| 5,038,866 | A | 8/1991 | Kern | | |
| 5,207,276 | A | 5/1993 | Scofield | | |
| 5,883,568 | A | 3/1999 | Boyden | | |
| 6,029,751 | A * | 2/2000 | Ford | A62C 3/006 | 169/65 |
| 6,491,110 | B2 | 12/2002 | Gil | | |
| 6,896,066 | B2 | 5/2005 | Gil | | |
| 6,981,555 | B2 * | 1/2006 | Smith | A62C 37/40 | 169/59 |
| 9,162,095 | B2 | 10/2015 | Thomas | | |
| 10,086,224 | B2 | 10/2018 | Thomas | | |
| 10,376,725 | B2 | 8/2019 | Thomas | | |
| 10,864,398 | B2 | 12/2020 | Thomas | | |
| 2008/0271902 | A1 * | 11/2008 | Johnson | A62C 37/36 | 169/56 |
| 2009/0050339 | A1 * | 2/2009 | Calabrese | A62C 13/76 | 169/61 |
| 2009/0321093 | A1 * | 12/2009 | Lalouz | A62C 37/12 | 169/65 |
| 2021/0101039 | A1 | 4/2021 | Thomas | | |

OTHER PUBLICATIONS

Non-Final Office Action for U.S. Appl. No. 17/122,891, dated Mar. 1, 2022.

* cited by examiner

SELF-CONTAINED FIRE EXTINGUISHER WITH AUTOMATED FIRE DETECTION

CROSS-REFERENCE TO OTHER APPLICATIONS

This application is a continuation of U.S. patent application Ser. No. 17/122,891, filed Dec. 15, 2020, entitled "AUTOMATED FIRE DETECTION TEMPERATURE-BASED FIRE DETECTION", which is herein incorporated by reference, and which in turn is a continuation of U.S. patent application Ser. No. 16/536,296, filed Aug. 8, 2019, entitled "TEMPERATURE-BASED FIRE DETECTION", which is herein incorporated by reference, and which in turn is a continuation of U.S. patent application Ser. No. 16/138,858, filed Sep. 21, 2018, entitled "TEMPERATURE-BASED FIRE DETECTION", which is herein incorporated by reference, and which in turn is a continuation of U.S. patent application Ser. No. 14/878,864, filed Oct. 8, 2015, entitled "TEMPERATURE-BASED FIRE DETECTION", which is herein incorporated by reference, and which in turn is a continuation of U.S. patent application Ser. No. 13/405,139, filed Feb. 24, 2012, entitled "TEMPERATURE-BASED FIRE DETECTION", which is herein incorporated by reference, and which in turn claims priority to U.S. Provisional Patent Application No. 61/451,062, filed Mar. 9, 2011, entitled "TEMPERATURE-BASED FIRE DETECTION", which is herein incorporated by reference.

BACKGROUND

Extinguishing fire suppression systems have used either a fixed temperature detector or a "rate of rise" detector which detects a temperature change in a time increment. These detectors are mechanical and are manufactured with a limited number of "trip points". The fixed temperature detectors are available, such as "trip points" at 135° F. or 190° F. There are many applications where there is a need to have an adjustable "trip point". By using a linear sensor the microcontroller may select the "trip point" for a peculiar application. Then, if the "rate of rise" detection is desired, the microcontroller can time the changes in temperature using the same linear sensor. If desired, the microcontroller could determine presence of a fire by a combination of temperature and "rate of rise".

Conventional fire extinguishers require user activation to release extinguishing agent towards a fire. Sprinkler systems can automatically suppress fires when fires are detected. However, there remains a need for reliable fire detection and automatic activation of a fire extinguisher.

SUMMARY

The invention pertains to a fire detection device that is able to be automatically activated so as to extinguish a fire. The fire detection can be rapid and temperature-based. Activation of the fire detection device can be electrically or mechanically induced to release an extinguishing agent at the fire. The activation can be protected such that it is durable and unaffected by vibrations.

The invention can be implemented in numerous ways, including as a method, system, device, or apparatus. Several embodiments are discussed below.

As a method for fire detection using a temperature sensor provided in an area to be monitored for a fire, one embodiment can, for example, include at least: obtaining a sensor electrical characteristic from the temperature sensor; comparing the sensor electrical characteristic is greater than a predetermined value; and releasing an extinguishing agent in the area if the comparing concludes that the sensor electrical characteristic is greater than the predetermined value.

As a method for fire detection using a temperature sensor provided in an area to be monitored for a fire, one embodiment can, for example, include at least: reading an applied voltage provided to the temperature sensor; reading a sensor voltage from the temperature sensor; determining a sensor resistance based on the sensor voltage and the applied voltage; determining whether the sensor resistance is greater than a predetermined trip point; and producing a control signal to initiate release of the extinguishing agent in the area if the determining determines that the sensor resistance is greater than the predetermined trip point.

As a fire extinguishing system, one embodiment can, for example, include at least: a fire extinguisher having an output nozzle, a breakable valve release, and a container, the container coupled to the output nozzle via the breakable valve release, and the contain including an extinguishing agent; and an automatic activation apparatus coupled to the fire extinguisher proximate to the breakable valve release, the automatic activation apparatus operable to (i) monitor local temperature, and (ii) induce breakage of the breakable valve release based on the monitored local temperature to thereby release at least a portion of the extinguishing agent.

As a fire detection apparatus, one embodiment can, for example, include at least: a temperature sensor for monitoring local temperature; a heat collector operatively coupled to the temperature sensor; and a control circuit operatively connected to the temperature sensor. The control circuit operable to compare the local temperature with a predetermined temperature and to output a fire detection signal if the local temperature is greater the predetermined temperature.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to a fire detection device that is able to be automatically activated so as to extinguish a fire. The fire detection can be rapid and temperature-based. In one embodiment, a heat collector can be provided to enhance thermal responsiveness. Activation of the fire detection device can be electrically or mechanically induced to release an extinguishing agent at the fire. The activation can be protected such that it is durable and unaffected by vibrations.

The following detailed description is illustrative only and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments are discussed below with reference to FIGS. 1-6. However, those skilled in the art will readily appreciate that the detailed description given herein with respect to these figures is for explanatory purposes as the invention extends beyond these limited embodiments.

Figure 1:
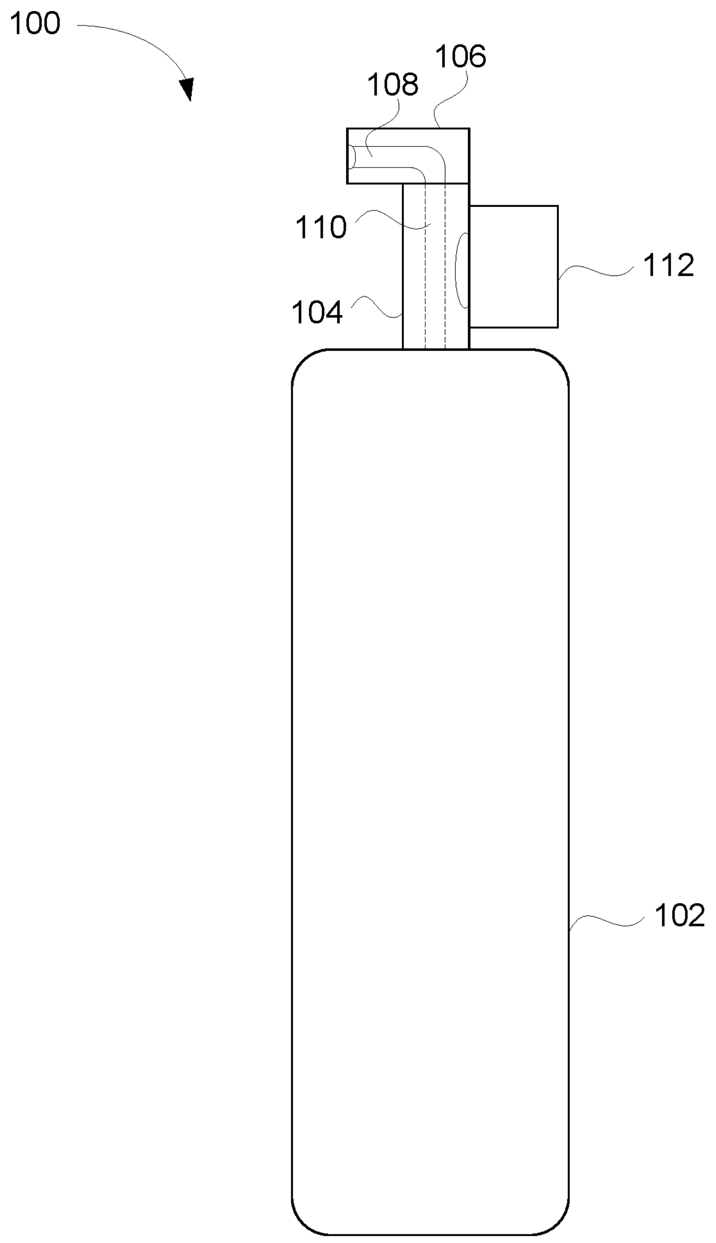
FIG. 1 is a side view of a fire detector according to one embodiment.

FIG. 1 is a side view of a fire detector 100 according to one embodiment. The fire detector 100 includes a container 102 that includes an extinguishing agent. The extinguishing agent can vary depending on application and may include one or more of water, foam, or agent with nano-particles. Attached to the top of the container 102 is a valve 104 and a nozzle 106. The valve 104 operates to prevent release of the extinguishing agent through the valve 104 to the nozzle 106. The nozzle 106 includes a nozzle opening 108. When the valve 104 is opened, the extinguishing agent from the container 102 is directed under pressure through a chamber 110 within the valve 104 and on to and through the nozzle opening 108 of the nozzle 106.

In its stored state, the extinguishing agent within the container 102 is held under pressure and retained within the container 102 by the valve 104. According to one embodiment, the valve 104 includes a removable valve release. In one embodiment, the removable valve release is removed by breaking the valve release, such can be referred to as a breakable valve release. When the removable valve release is in place, the valve 104 prevents the release of the extinguishing agent from the container 102. On the other hand, when the removable valve release is broken, the extinguishing agent is released from the container 102 and flows through the chamber 110 of the valve 104 and out through the nozzle opening 108 such that it can be directed towards a fire.

In addition, the fire extinguisher 100 includes an automatic activation apparatus 112. In the embodiment illustrated in FIG. 1, the automatic activation apparatus 112 is coupled to the valve 104. The automatic activation apparatus 112 can, for example, monitor local temperature and induce removal (e.g., breakage) of the removable valve release (e.g., breakable valve release) when appropriate. For example, when the monitored local temperature exceeds a threshold temperature indicative of the presence of a fire, the automatic activation apparatus 112 can induce removal (e.g., breakage) of the removable valve release of the valve 104. Advantageously, the automatic activation apparatus 112 is able to reliably and rapidly monitor local temperature and, when appropriate, automatically activate release of the extinguishing agent from the container 102 via the nozzle 106.

Figure 2:
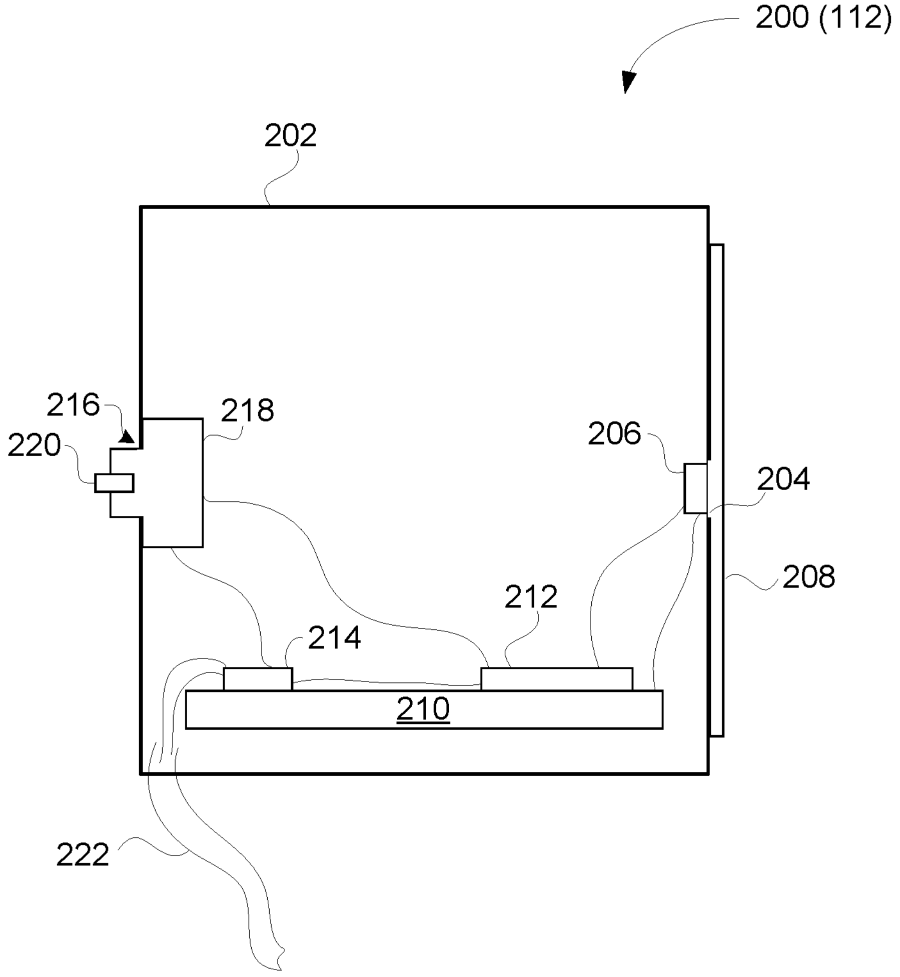
FIG. 2 illustrates an exemplary cross-sectional top view of an automatic activation apparatus according to one embodiment.

FIG. 2 illustrates an exemplary cross-sectional top view of an automatic activation apparatus 200 according to one embodiment. The automatic activation apparatus 200 can, for example, be suitable for use as the automatic activation apparatus 112 illustrated in FIG. 1.

The automatic activation apparatus 200 includes a housing 202 that contains the various components of the automatic activation apparatus 200. The housing 202 includes an opening 204 that exposes a temperature sensor 206. The temperature sensor 206 can vary with application and implementation. As one example, the temperature sensor can be a Resistance Temperature Detectors (RTD), such as thin film RTD element. A RTD is a sensor that measures temperature by correlating the resistance of the RTD element with temperature.

A heat collector 208 can be thermally coupled to the temperature sensor 206. The heat collector 208 can be formed of any of a number of different materials that offer efficient thermal conductivity. As one example, the heat collector 208 can be made of (or at least coated with) metal, such as platinum, aluminum, gold, silver or copper. In one implementation, the heat collector 208 can formed as sheet (e.g., plate) of metal. In another implementation, the heat collector 208 can be formed as a metal coating on a substrate material (which can be a metal or non-metal material). The thickness of the heat collector 208 is generally thin for thermal responsiveness, but its thickness can vary depending on implementation. As an example, in one embodiment, the thickness of the heat collector can vary in the range of about 0.1-0.5 millimeters. The heat collector 208 serves to collect local heat (thermal radiation) so that the responsiveness of the temperature sensor 206 is enhanced. In other words, the heat collector 208 allows the automatic activation apparatus 202 to rapidly sense temperature conditions associated with a fire.

Internal to the housing 202 are various electrical components to support the automatic activation apparatus 200. In particular, the housing 202 includes a substrate 210. The substrate 210 can pertain to a printed circuit board 210. The printed circuit board 210 can support one or more integrated circuits, electronic components, wire traces or wires. As illustrated in FIG. 2, the substrate 210 can support a controller 212 (e.g., microcontroller) and a voltage regulator 214. The controller 212 and the voltage regulator 214 are electrical circuits, and can be implemented as integrated circuits. In addition, the housing 202 can include an opening 216 to support an activation element 218. In one embodiment, the activation element 218 is a solenoid-activated device. In another embodiment, the activation element 218 is a miniature explosive element. The miniature explosive element can, for example, be referred to as a squib. The activation element 218 can include a protruding member 220. The activation element 218 can be electrically activated and, once activated, the protruding member 220 can be rapidly forced outward. When the housing 202 for the automatic activation apparatus 200 is mounted against the valve 104 having a removable valve release (e.g., breakable valve release), the protruding member 220 when forced outward upon activation, can operate to remove (e.g., break) the removable release valve and thereby activate the fire extinguisher 100 so that the extinguishing agent within the container 102 is propelled outward from the nozzle opening 108 of the nozzle 106.

The electrical components of the automatic activation apparatus 200 can be powered from an externally supplied power. A power cord 222 can provide the external power to the voltage regulator 214 which can in turn provide power to any of the electrical components, including the controller 212 and the activation element 218. For example, in one embodiment, the external power can be 12 Volts (V) or 24 V and the voltage regulator 214 can convert the voltage to 5 V or 3 V for use by the electrical components within the housing 202.

Figure 3:
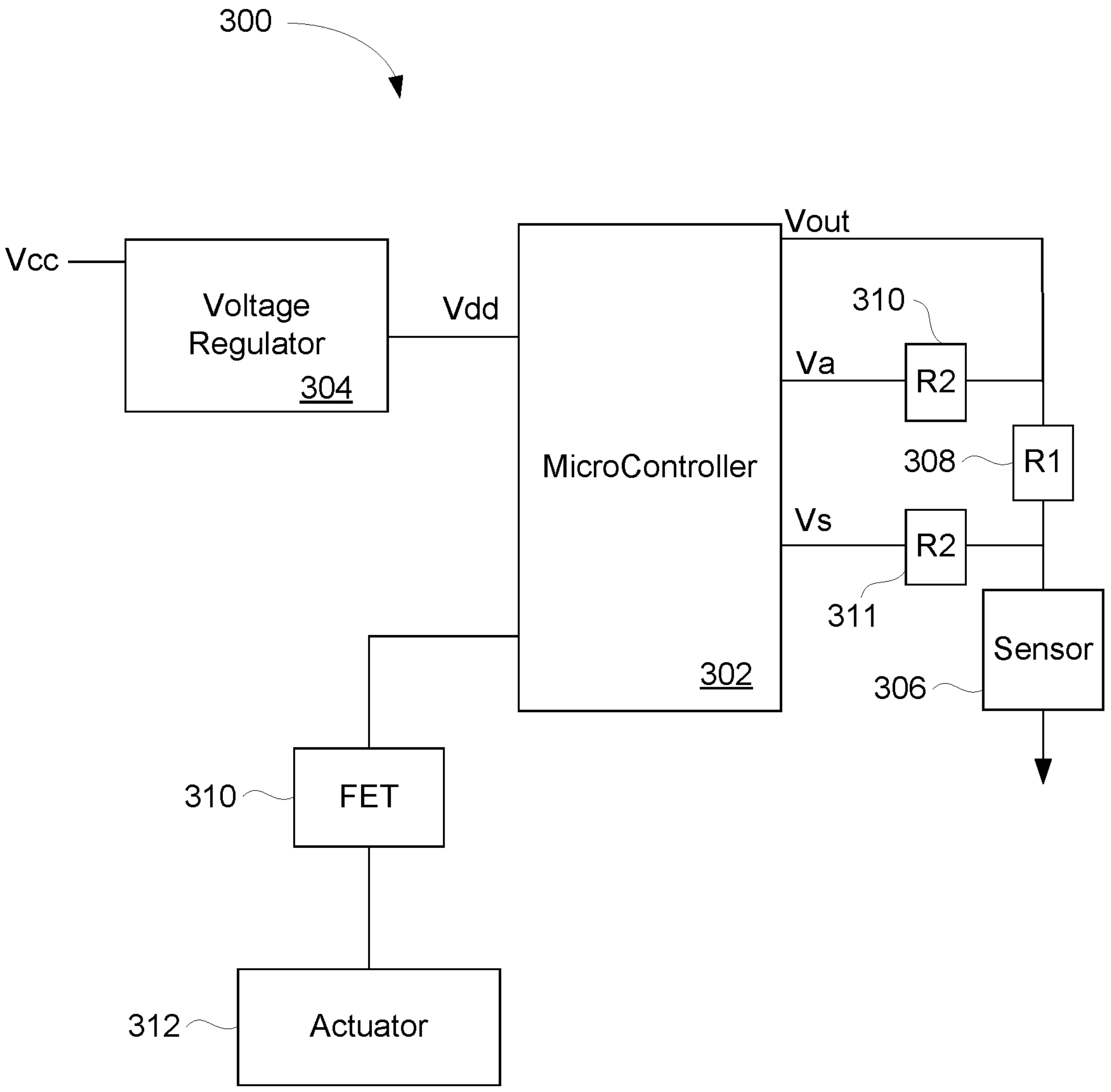
FIG. 3 is a block diagram of an automatic activation apparatus according to one embodiment.

FIG. 3 is a block diagram of an automatic activation apparatus 300 according to one embodiment. The automatic activation apparatus 300 is, for example, suitable for use as the automatic activation apparatus 112 illustrated in FIG. 1 or the automatic activation apparatus 200 illustrated in FIG. 2.

The automatic activation apparatus 300 includes a microcontroller 302 that controls the operation of the automatic activation apparatus 300. The automatic activation apparatus 300 also includes a voltage regulator 304 the voltage regulator 304 receives an input voltage Vcc and produces an output voltage Vdd. The output voltage Vdd is applied to the microcontroller 302. The microcontroller 302 is coupled to a sensor 306, such as a temperature sensor, and one or more resistors, such as resistors 308, 310 and 311. The microcontroller 302 operates to supply a voltage Vout to the sensor 306 by way of the resistor R1 308. After the voltage Vout is output, the microcontroller 302 can read a sensor voltage (Vs) and an applied voltage (Va). The sensor voltage is the voltage across the sensor 306 by way of the resistor R2 311 (though resistor R2 provides has little on no voltage drop since there is little or no current). The applied voltage is the voltage across applied to the resistor R1 308 by way of the resistor R2 310 (though resistor R2 provides has little on no voltage drop since there is little or no current). The applied voltage is representative of the value of the voltage Vout being used to power the sensor 306 by way of the resistors 308 and 310. Namely, the applied voltage is the voltage applied to the resistor R1 308. The applied voltage (Va) can possibly vary with load to the voltage Vout; hence, by reading the applied voltage, the loading and thus the potentially varying voltage Vout can be monitored for more accurate temperature monitoring. However, it should be noted that in some embodiment there is not need to monitor the applied voltage (Va) since it is not substantially impacted by loading.

After receiving the sensor voltage (Vs) and the applied voltage (Va), the microcontroller 302 can determine whether the temperature identified by the sensor 306 is indicative of a fire in the vicinity of the voltage activation apparatus 300. For example, in one embodiment, the microcontroller can determine the resistance of the temperature sensor 306 by use of the sensor voltage (Vs) and the applied voltage (Va). In one embodiment, the resistance of the temperature sensor 306 can be computed as $(R1 \times Vs)/(Va - Vs)$.

After the resistance of the temperature sensor 306 is determined, the microcontroller 302 can determine whether the resistance of the temperature sensor 306 correlates to a temperature greater than a predetermined trip point (or threshold value). When the microcontroller 302 detects the presence of a fire based on the data obtained from the temperature sensor 306 and the predetermined trip point, a control signal can be supplied to a Field-Effect Transistor (FET) 310 which in turn supplies a modified control signal to an actuator 312. The FET 310 can pertain to a current limited field-effect transistor that serves to condition the control signal for not only protection of the microcontroller 302 but also to better drive (source or sink current to) the actuator 312. That is, the modified control signal can operate to induce the actuator 312 to cause release of an extinguishing agent. For example, the actuator 312, in one embodiment, can utilize a miniature explosive element that upon activation causes the release of the extinguishing agent. In another embodiment, the actuator 312 can use a solenoid that upon activation can induce release of the extinguishing agent. In general, the actuator 312 represents any mechanism that is able to cause release of the extinguishing agent in an automated fashion under the control of an electrical signal. Although not shown in FIG. 3, it should be noted that the output voltage Vdd can also be supplied to the actuator 312.

In the automatic activation apparatus 200 illustrated in FIG. 2 and the automatic activation apparatus 300 illustrated in FIG. 3, a single temperature sensor 206, 306 is illustrated. However, it should be understood that an automatic activation apparatus can, in general, include one or more temperature sensors. A controller or control circuitry of an automatic activation apparatus can operate to sense temperature using the one or more temperature sensors. The controller or control circuitry can also operate to activate one or more actuators which can cause release of extinguishing agent from one or more containers. In one embodiment, a given temperature sensor can be associated with a particular container or nozzle, such that sensing of a fire from a particular sensor can cause release of extinguishing agent from an appropriate container (or nozzle). In obtaining sensor data from a plurality of sensors, the controller or control circuitry can be sequentially activated and sensed data from the plurality of sensors, or all the sensors could always be activated and then sequentially sensed.

Additionally, for a given fire detection system, one or more automatic activation apparatuses can be utilized. In the embodiment illustrated in FIG. 1, the automatic activation apparatus 112 is coupled to the fire extinguisher 100 proximate to the valve 104 thereof. While this arrangement does facilitate use of the protruding member 220 of the activation element 218 to engage a removable (or breakable) portion within the valve 104 shown in FIG. 1. However, in other embodiments, one or more automatic activation apparatuses can be positioned differently with respect to a fire extinguisher or can be remotely located from the fire extinguisher. For example, one or more wires and or a wireless communication channel can be utilized to provide one or more control signals to an activation element which is positioned proximate to the valve 104 of the fire extinguisher 100. Again, as noted above, these remotely located automatic activation apparatuses can each individually or in combination be used to detect the fire and cause an activation element of one or more fire extinguishers to cause release of an extinguishing agent.

Figure 4:
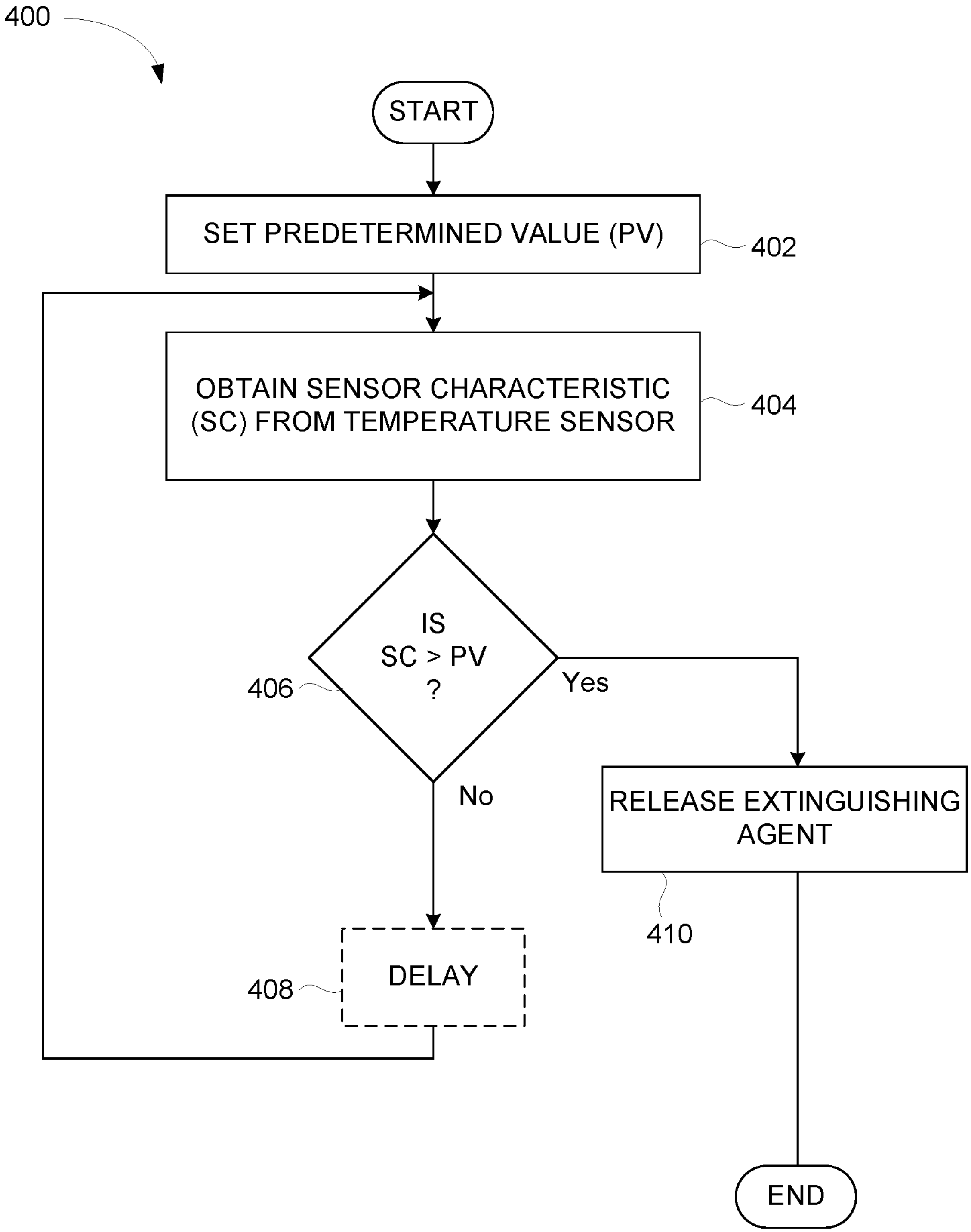
FIG. 4 is a flow diagram of a fire detection method according to one embodiment.

FIG. 4 is a flow diagram of a fire detection method 400 according to one embodiment. The fire detection method 400 can, for example, be performed by the automatic activation apparatus 112 illustrated in FIG. 1, the automatic activation apparatus 200 illustrated in FIG. 2, or the automatic activation apparatus 300 illustrated in FIG. 3.

The fire detection method 400 can set 402 a predetermined value (PV) that is to be utilized to detect a fire. Next, at least one sensor characteristic (SC) can be obtained 404 from a temperature sensor. The sensor characteristic is an electrical characteristic associated with a temperature sensor. For example, the sensor characteristic can represent current, voltage or resistance of the temperature sensor. The sensor characteristic is dependent upon temperature so that temperature can be monitored. The sensor characteristic is thus utilized to determine a temperature as monitored or measured by the temperature sensor.

Next, a decision 406 can determine whether the sensor characteristic (SC) is greater than the predetermined value (PV). When the decision 406 determines that the sensor characteristic is not greater than the predetermined value, the fire detection method 400 is currently not detecting the presence of fire. In this case, following an optional delay 408, the fire detection method 400 can repeat the blocks 404 and 406 until the decision 406 determines that the sensor characteristic is greater than the predetermined value. The delay 408 can vary depending upon implementation. As an example, the delay 408 can be on the order of milliseconds or seconds.

On the other hand, when the decision 406 determines that the sensor characteristic is greater than the predetermined value, the fire detection method 400 operates to release 410 an extinguishing agent. The release 410 of the extinguishing agent can serve to suppress or extinguish a fire that has been detected by the fire detection method 400. Following the release of the extinguishing agent 410, the fire detection method 400 can end. However, in other embodiments, if there is additional extinguishing agent available, the fire detection method 400 could reset and continue to sense and extinguish one or more fires.

Figure 5:
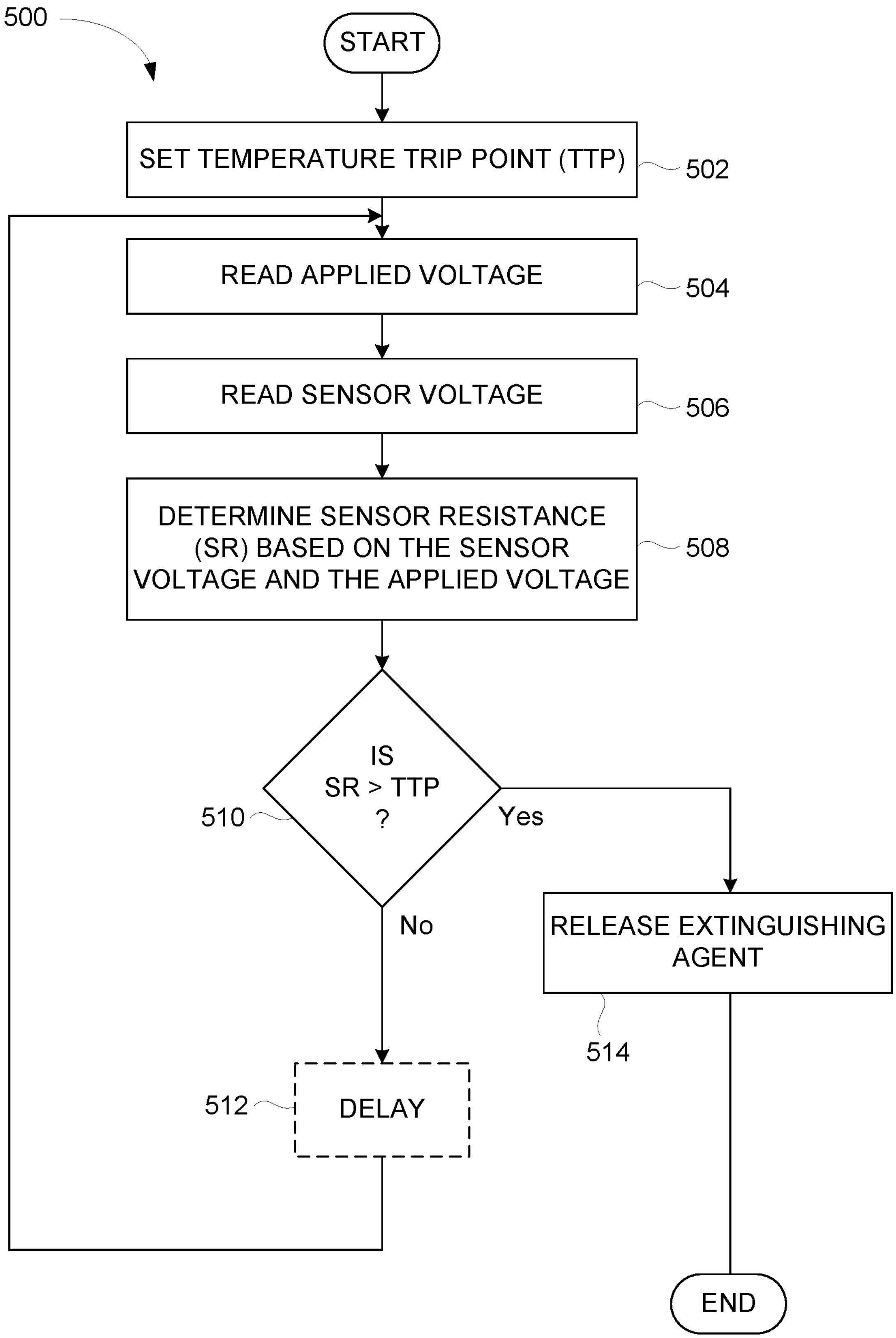
FIG. 5 is a flow diagram of a fire detection method according to one embodiment.

FIG. 5 is a flow diagram of a fire detection method 500 according to one embodiment. The fire detection method 500 can, for example, be performed by the automatic activation apparatus 112 illustrated in FIG. 1, the automatic activation apparatus 200 illustrated in FIG. 2, or the automatic activation apparatus 300 illustrated in FIG. 3.

The fire detection method 500 can be used to detect and suppress the fire. The fire detection method 500 can set 502 a temperature trip point (TTP). In addition, an applied voltage can be read 504, and a sensor voltage can be read 506. The applied voltage is the voltage associated with a voltage being applied to sensor circuitry including a temperature sensor, and the sensor voltage is the voltage at the temperature sensor. In addition, a sensor resistance (SR) can be determined 508 based on the sensor voltage and the applied voltage.

After the sensor resistance (SR) has been determined 508, a decision 510 can determine whether the sensor resistance (SR) is greater than the temperature trip point (TTP). When the decision 510 determines that the sensor resistance is not greater than the temperature trip point, the fire detection method 500 is currently not detecting the presence of a fire. Hence, in this case, after an optional delay 512, the fire detection method 500 can return to repeat the block 504 and subsequent blocks so that the temperature sensor can be repeatedly monitored so that the presence of a fire can be rapidly detected. The delay 512 can vary depending upon implementation. For example, the delay 512 can be on the order of milliseconds or seconds.

On the other hand, when the decision 510 determines that the sensor resistance is greater than the temperature trip point, the fire detection method 500 has detected a fire. Consequently, in this case, the fire detection method 500 can release 514 an extinguishing agent. The extinguishing agent can then suppress or extinguish the fire that has been detected. Following the release 514 of the extinguishing agent, the fire detection method 500 can end. However, in other embodiments, if there is additional extinguishing agent available, the fire detection method 500 could reset and continue to sense and extinguish one or more fires.

Figure 6:
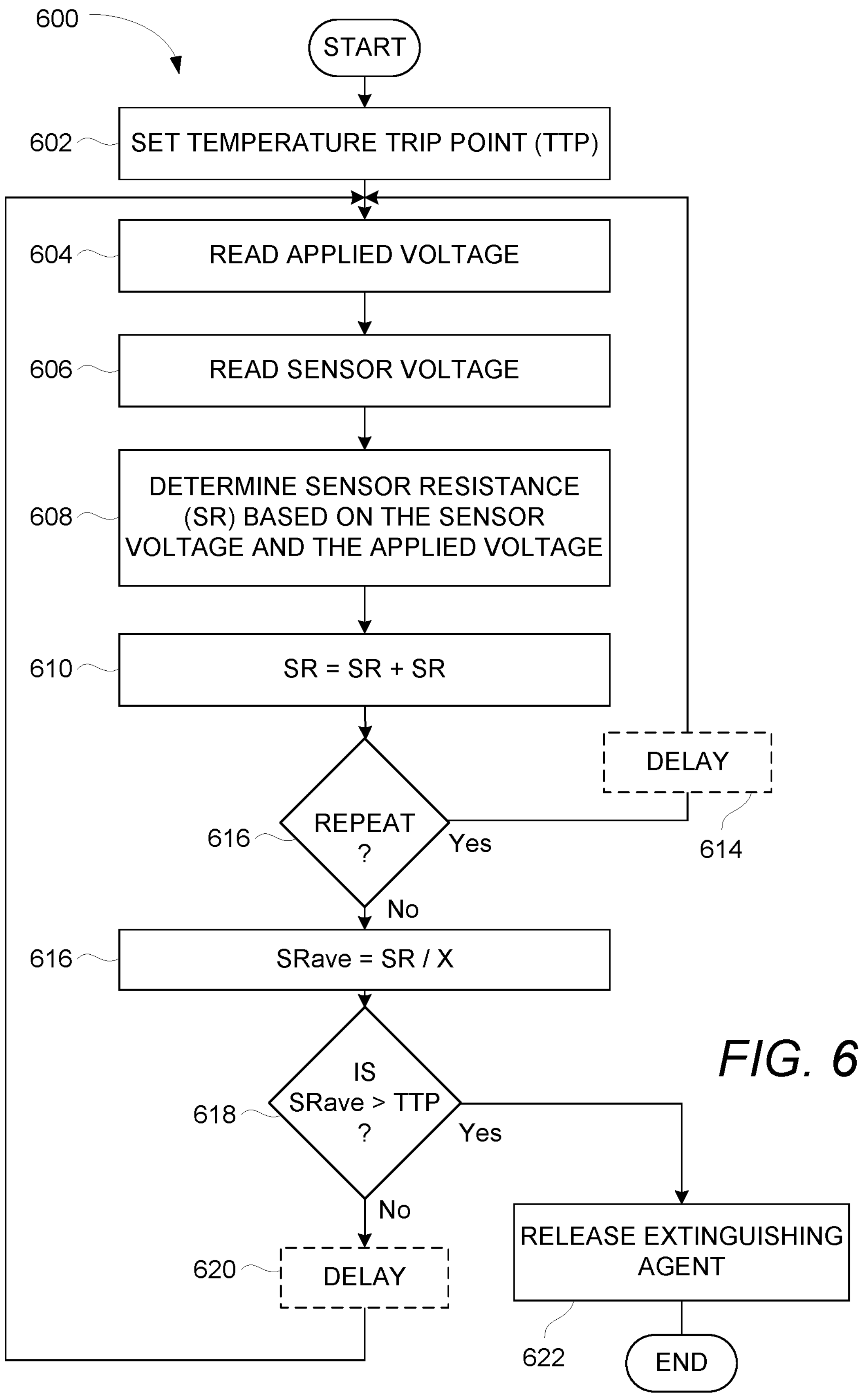
FIG. 6 illustrates a flow diagram of a fire detection method according to another embodiment.

FIG. 6 illustrates a flow diagram of a fire detection method 600 according to another embodiment. The fire detection method 600 can, for example, be performed by the automatic activation apparatus 112 illustrated in FIG. 1, the automatic activation apparatus 200 illustrated in FIG. 2, or the automatic activation apparatus 300 illustrated in FIG. 3.

The fire detection method 600 can set 602 a temperature trip point (TIP). Next, an applied voltage can be read 604, and a sensor voltage can be read 606. Then, a sensor resistance (SR) can be determined 608 based on the sensor voltage and the applied voltage. The sensor resistance can then be accumulated 610. The accumulation of the sensor resistance can be performed a predetermined number (X) times. A decision 612 can determine whether the sensor voltage and the sensor resistance determination (and its accumulation) should be repeated. For example, the decision 612 can cause the blocks 604 through 610 to be performed a total of X times. Between each repetition, a delay 614 can be optionally provided. The delay can serve to reduce power consumption, but the delay is typically kept rather short (e.g., less than 10 millisecond (ms)) so that responsiveness does not substantially suffer.

After the decision 612 determines that the sensor resistance has been determined 608 and accumulated 610 a total of X times, an average sensor resistance (SRave) can be computed by dividing the accumulated sensor resistance by X. A decision 618 can then determine whether the average sensor resistance (SRave) is greater than the temperature trip point (TTP). When the decision 618 determines that the average sensor resistance is not greater than the temperature trip point, the fire detection method 600 can return to repeat the block 604 and subsequent blocks so that fire detection can continue. A delay 620 can optionally be imposed before repeating the block 604 and subsequent blocks. Although the delay 620 can serve to reduce power consumption, the delays maintained relatively short (e.g., less than 10 seconds) so that the responsiveness of the fire detection capability remains rapid.

On the other hand, when the decision 618 determines that the average sensor resistance is greater than the temperature trip point, the fire detection method 600 can release 622 an extinguishing agent. The extinguishing agent upon being released can serve to suppress or extinguish the fire that has been detected. Following the release 622 of the extinguishing agent, the fire detection method 600 can end. However, in other embodiments, if there is additional extinguishing agent available, the fire detection method 600 could reset and continue to sense and extinguish one or more fires.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While embodiments and applications have been shown and described, it would be apparent to those skilled in the art having the benefit of this disclosure that many more modifications than mentioned above are possible without departing from the inventive concepts herein.

What is claimed is:

1. A method for fire detection using temperature sensing in an area to be monitored for a fire, said method comprising:

providing at least one self-contained fire extinguisher proximate to the area to be monitored for a fire, the self-contained fire extinguisher including (i) a container having an extinguishing agent therein and (ii) a temperature-based automatic activation apparatus, the temperature-based automatic activation apparatus being mounted to the container and including at least a temperature sensing element and a heat collector, the heat collector being thermally coupled the temperature sensing element so as to enhance temperature responsiveness of the temperature sensing element, the heat collector being a distinct component from the temperature sensing element;

monitoring, via at least the temperature sensing element and the heat collector of the temperature-based activation apparatus, temperature associated with the area to be monitored for a fire; and automatically activating, via the temperature-based activation apparatus, release of the extinguishing agent from the container to at least a portion of the area if said monitoring concludes, based on the monitoring of temperature associated with the area to be monitored for a fire, that the self-contained fire extinguisher should be activated.

2. A method as recited in claim 1, wherein the self-contained fire extinguisher includes a breakable valve release that retains the extinguishing agent in the container, and wherein the activating release of the extinguishing agent from the container is induced by breakage of the breakable valve release.

3. A method as recited in claim 1, wherein the activating release of the extinguishing agent from the container is based on the monitored temperature exceeding a threshold temperature indicative of the presence of a fire.

4. A method as recited in claim 3, wherein the self-contained fire extinguisher includes a breakable valve release that retains the extinguishing agent in the container, and wherein the activating release of the extinguishing agent from the container is induced by breakage of the breakable valve release.

5. A method as recited in claim 1, wherein the self-contained fire extinguisher is a stand-alone device that can automatically sense and suppress a fire.

6. A self-contained fire detection apparatus, comprising:

a container including an extinguishing agent;

a valve with a breakable valve release that retains the extinguishing agent in the container, and a temperature-based automatic activation apparatus, the temperature-based automatic activation apparatus being mounted to the container, the temperature-based automatic activation apparatus is configured to induce breakage of the breakable valve release dependent on a temperature, wherein the temperature-based automatic activation apparatus includes at least a temperature sensing element and a heat collector, the heat collector being thermally coupled the temperature sensing element so as to enhance temperature responsiveness of the temperature sensing element, the heat collector being a distinct component from the temperature sensing element.

7. A self-contained fire detection apparatus as recited in claim 6, wherein the temperature is a monitored local temperature, wherein the temperature-based automatic activation apparatus is configured to induce breakage of the breakable valve release when the monitored local temperature exceeds a threshold temperature indicative of the presence of a fire.

8. A self-contained fire detection apparatus as recited in claim 7, wherein the self-contained fire detection apparatus is a stand-alone device that can automatically sense and suppress a fire.

9. A self-contained fire detection apparatus as recited in claim 6, wherein the self-contained fire detection apparatus is a stand-alone device that can automatically sense and suppress a fire.

10. A self-contained fire detection apparatus as recited in claim 6, wherein the temperature-based automatic activation apparatus includes at least an activation element, and wherein at least the activation element is configured to induce breakage of the breakable valve release dependent on a temperature.

* * * * *